United States Patent [19]
Denis

[11] 3,759,613
[45] Sept. 18, 1973

[54] PHOTOPLOTTER CASSETTE

[75] Inventor: Richard E. Denis, Beverly, Mass.

[73] Assignee: Computervision Corporation, Burlington, Mass.

[22] Filed: May 5, 1971

[21] Appl. No.: 140,465

[52] U.S. Cl. ................................................. 355/73
[51] Int. Cl. ......................................... G03b 27/60
[58] Field of Search ..................... 95/72; 355/73, 76

[56] References Cited
UNITED STATES PATENTS

| | | | |
|---|---|---|---|
| 3,237,543 | 3/1966 | Hoffman | 355/73 X |
| 3,572,228 | 3/1971 | Ternes | 355/73 X |
| 1,641,420 | 9/1927 | Folmer | 95/72 UX |
| 2,464,725 | 3/1949 | Shesnak | 95/72 |
| 3,146,690 | 9/1964 | Hoffman | 355/73 X |

Primary Examiner—Samuel S. Matthews
Assistant Examiner—Michael L. Gellner
Attorney—Chittick, Pfund, Birch, Samuels & Gauthier

[57] ABSTRACT

A cassette adapted to be loaded with either or both photographic film or a glass plate for use in a light-tight photoplotter. The cassette has vacuum drawing means for holding the film on one side of the cassette and conventional means for holding the glass plate on the other side of the cassette. The cassette can be mounted in the photoplotter with either side facing the lens.

8 Claims, 2 Drawing Figures

PATENTED SEP 18 1973

3,759,613

INVENTOR
RICHARD E. DENIS
BY Chittick, Pfund,
Birch, Samuels + Gauthier
ATTORNEYS

3,759,613

PHOTOPLOTTER CASSETTE

BACKGROUND OF THE INVENTION

This invention is used in precision photoplotting machines. Specifically, the invention is a film and glass plate cassette which is loaded into a photoplotter and fixed to a translating table underlying a photo head comprising a light source, a rotatable aperture disc containing characters and symbols and a lens.

SUMMARY OF THE INVENTION

The cassette of this invention has a perforated film support plate, an imperforate glass support plate and a cassette frame gripping the peripheries of these two plates and holding them in superposed, spaced-apart relationship such that a vacuum chamber is formed therebetween. A remotely located vacuum pump has a flexible line attached to the vacuum chamber for drawing the film to be exposed against the film support plate. Tape or other hold-down means is used to fix a glass plate to be exposed against the glass support plate. The cassette can be mounted in the photoplotter with either side facing the photo head.

DESCRIPTION OF THE PREFERRED EMBODIMENT

Figure 1:
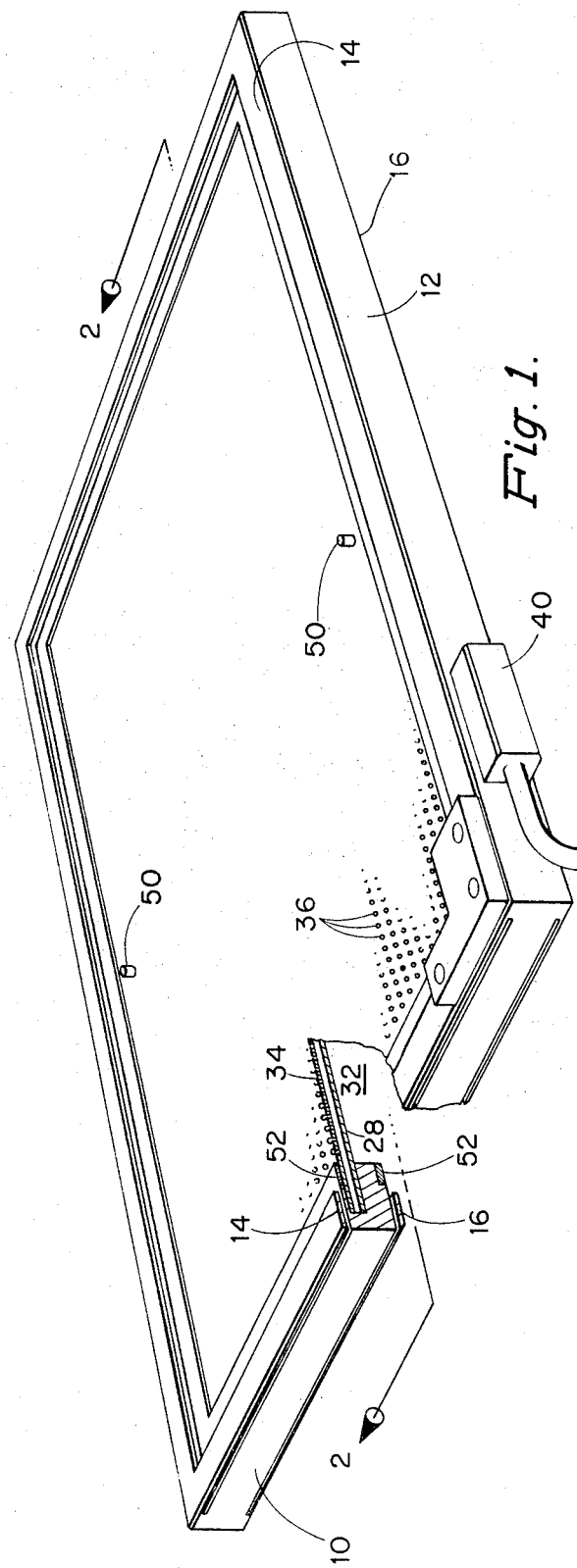
FIG. 1 is a perspective view of the cassette of this invention, partly broken away to show the vacuum chamber interior.
Figure 2:
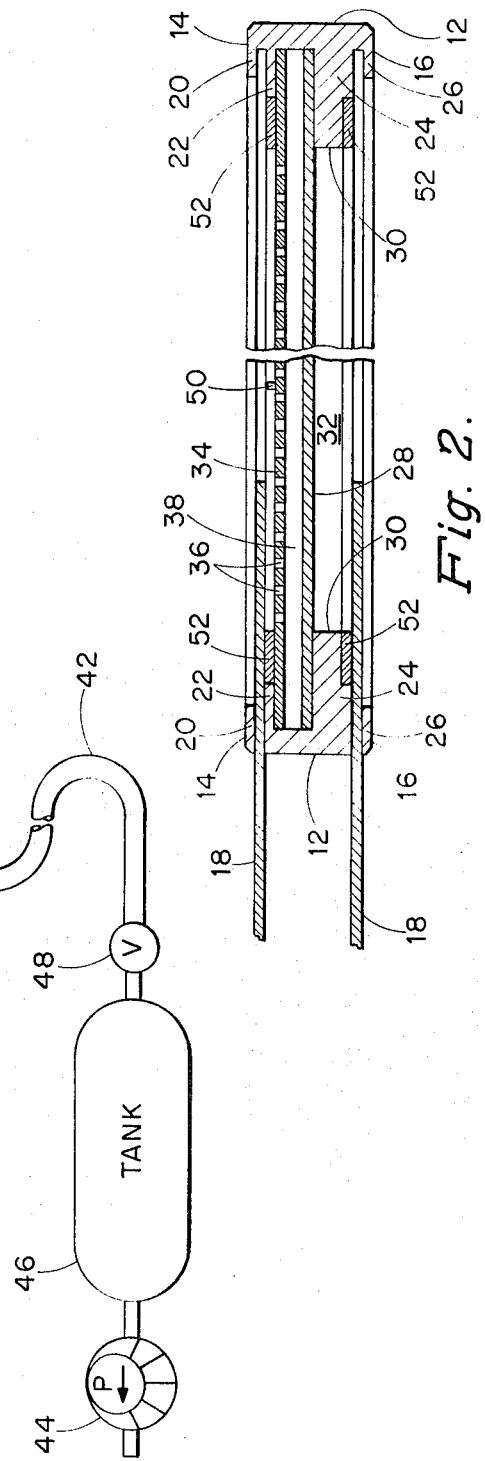
FIG. 2 is a view in section of the cassette taken along line 2—2 of FIG. 1.

The cassette of this invention is shown most clearly in FIG. 1. Frame 10 is of rectangular shape when viewed from above. In section, as shown in FIG. 2, frame 10 has vertical side edges 12, horizontal top edges 14 and horizontal bottom edges 16. One side of the frame is slotted (see the right side of FIG. 2) to permit light-tight cover plates 18 to be inserted into and withdrawn from frame 10. The cover plates 18 slide in slots formed by inwardly protruding frame ribs 20, 22, 24 and 26.

An imperforate glass support plate 28 is mounted in frame 10 and is fixed against the upper surface of rib 24. Plate 28 is rectangular and forms a support surface for a photographic glass plate having a photo-sensitive emulsion applied to its lower face. A glass plate (not shown) of conventional type and having a thickness selected to match the vertical dimension of rib face 30 may be mounted in the space designated 32. The glass plate is held in space 32 by tape, clamps, clips or other conventional holding means. It will be seen in FIG. 2 that the lower cover plate 18 has clearance with respect to the glass plate so that it does not scratch the emulsion thereon.

A perforated film support plate 34 is mounted in frame 10 and is fixed against the lower surface of rib 22. Plate 34 is rectangular and forms a support surface for a sheet of photographic film (not shown). Plate 34 has a large number of perforations 36 formed therein, preferably in a regular pattern. It will be seen from FIG. 2 that between film support plate 34 and glass support plate 28 a hollow vacuum chamber 38 is formed.

To lower the air pressure in vacuum chamber 38, a pumping means is provided. FIG. 1 shows a removable fitting 40 which is attached to an opening in frame side edge 12. A passageway in fitting 40 connects the vacuum chamber interior to a hollow flexible tube 42 which has considerable length. Tube 42 links the vacuum chamber 38 with a pneumatic pump 44, an air capacitor tank 46 and a large orifice solenoid-operated valve 48. The purpose of these elements is to operate to lower the air pressure in vacuum chamber 38 to draw the film sheet tightly against film support plate 34. The film which is mounted on plate 34 is preferably pre-punched on at least two of its edges and is positioned onto tooling pins 50 where it is held against lateral displacement. To lower the pressure on vacuum chamber 32, valve 48 is closed and pump 44 is continuously operated to reduce the pressure in the large volume air capacitor tank 46. Then, valve 48 is opened and the resulting high mass air flow through perforations 36 firmly captures and grips the film against plate 34. If the film is smaller than and does not cover the entire plate perforation area, a mask or strips of tape are previously applied to the uncovered perforated plate areas. After the film has been gripped by the air pressure differential effect, the valve 48 may be closed.

In operation, the cassette of this invention can be loaded in the dark with either film or a glass plate or both. Then, the appropriate cover plate(s) 18 is inserted into the frame to protect the photo-sensitive medium from accidental exposure. To increase the cassette's light-tight characteristics, a fabric strip 52, such as flock, is fixed to the upper surface of film support plate 34 and the lower surface of rib 24. These flock strips prevent light from entering between the cover plates and the ribs in which the cover plates are slidably carried. The cassette is then loaded into the photoplotter and fixed on an underlying bed which is driven by stepping motors in any horizontal direction in accordance with the instructions received from an interfaced computer. The cover plate 18 is removed after the cassette is loaded into the photoplotter.

If the glass plate side of the cassette is to be exposed, the pumping means is not required and the cassette is positioned on the bed with bottom frame edges 16 facing up. Conversely, if the film side of the cassette is to be exposed, fitting 40 is attached to frame 10 and the film is drawn tightly against the film support plate 34 by the pumping means. For film exposure, the cassette is positioned on the bed with top frame edges 14 facing up. The cassette frame construction is geometrically designed so that the film is positioned at the same vertical height from the underlying bed when it is being exposed as the glass plate is positioned relative to the underlying bed when it is being exposed by the overhanging photo head. This is accomplished by constructing the cassette so that the vertical distance from the bottom edge surfaces 16 to the glass support plate 28 is substantially greater than the vertical distance from the top edge surfaces 14 to the film support plate 34. By "substantially," it is meant by an added distance equal to the vertical dimension of the glass plate, assuming the film sheet has no effective vertical dimension. Thus, the cassette is completely compatible with the photo head set-up regardless of whether the film side or the glass plate side of the cassette is facing up to be exposed.

From the foregoing description, it can be seen that the casstte of this invention is a very convenient and easy-to-use accessory for the photoplotter and provides increased flexibility, speed and accuracy of film or glass plate mounting. Furthermore, the cassette is simple in construction and relatively inexpensive to manufacture.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A cassette adapted to accommodate photographic film on one of its sides and a photographic glass plate on its other side for use in a photoplotter comprising:
   a. a substantially rectangular perforated film support plate;
   b. a substantially rectangular imperforate glass support plate underlying said film support plate;
   c. a substantially rectangular cassette frame supportably gripping the peripheries of said film and said glass support plates and holding them in superposed spaced-apart relation such that a vacuum chamber is formed therebetween;
   d. remotely located pump means communicating with the interior of said vacuum chamber for lowering the air pressure therein; and
   e. said cassette frame having horizontal top edge surfaces spaced vertically from said film support plate, said cassette frame having horizontal bottom edge surfaces spaced vertically from said glass support plate, the top edge film support plate spaced distance being less than said bottom edge — glass support plate spaced distance by an amount equal to the difference between the respective thicknesses of the film and glass plate to be accomodated;
   whereby photographic film positioned on said film support plate is retained thereon by the action of said pump means and a photographic glass plate positioned on said glass support plate is retained thereon by conventional holding means.

2. The cassette of claim 1 wherein said film support plate is perforated in a regular pattern across substantially its entire film supporting surface.

3. The cassette of claim 1 wherein said pump means includes a pneumatic pump, an air capacitor tank directly communicating with said pump, a flexible conduit connecting said capacitor tank with said vacuum chamber and a valve mounted between said air capacitor tank and said vacuum chamber.

4. The cassette of claim 3 wherein said valve is a large orifice solenoid-operated valve which, when opened, causes the film to be captured against said film support plate.

5. The cassette of claim 1 further including two substantially rectangular removable cover plates, and mounting means incorporated into said cassette frame, said mounting means adapted to engage said cover plates to completely exclude light from impinging upon said film support plate and said glass support plate when said cassette is outside of the photoplotter.

6. The cassette of claim 5 wherein said mounting means includes ribs formed in said cassette frame for slidably receiving said cover plates.

7. The cassette of claim 5 further having a peripheral lining of packing material attached to said cassette frame adjacent said mounting means in position to contribute to the total exclusion of light from entering between said cover plates and said cassette frame.

8. The cassette of claim 1 wherein said film support plate has at least two upstanding tooling pins mounted thereon in locations selected to be in alignment with holes pre-punched in the photographic film, said tooling pins adapted to engage the pre-punched film to ensure accurate and repeatable location of the film on said film support plate.

* * * * *